United States Patent [19]

Haruna et al.

[11] Patent Number: 5,124,416
[45] Date of Patent: Jun. 23, 1992

[54] METHOD FOR PRODUCTION OF ABSORBENT POLYMER

[75] Inventors: Yoshinobu Haruna, Hixson, Tenn.; Akito Yano; Yoshio Irie, both of Hyogo, Japan; Teruaki Fujihara, Kyoto, Japan

[73] Assignee: Nippon Shokubai Kagaku Kogyo, Co., Ltd., Osaka, Japan

[21] Appl. No.: 513,074

[22] Filed: Apr. 23, 1990

Related U.S. Application Data

[63] Continuation-in-part of Ser. No. 355,916, May 23, 1989, abandoned.

[30] Foreign Application Priority Data

May 23, 1988 [JP] Japan .................................. 63-122253

[51] Int. Cl.$^5$ ......................... C08F 2/10; C08F 220/06
[52] U.S. Cl. ........................................ 526/62; 526/88; 526/317.1
[58] Field of Search .................... 526/62, 88, 317.1

[56] References Cited

U.S. PATENT DOCUMENTS 3,503,938  3/1970  Blurton et al. ................... 526/62
4,049,895  9/1977  McOnie et al.
4,625,001  11/1986 Tsubakimoto et al. ............ 526/62
4,758,639  7/1988  Koyamagi et al.

FOREIGN PATENT DOCUMENTS 49-2339   1/1974  Japan .
17249 B   1/1979  Japan .
1140526   1/1969  United Kingdom .
2002397   2/1979  United Kingdom .

OTHER PUBLICATIONS

Euro Search Report EP 89 30 5192, 29 Aug., 1990.

Primary Examiner—Joseph L. Schofer
Assistant Examiner—Tom Weber
Attorney, Agent, or Firm—Omri M. Behr

[57] ABSTRACT

A method for the production of an absorbent polymer by the polymerization of a liquid containing an aqeous hydrophilic monomer solution in a reaction vessel provided with at least one rotary stirring blade, which comprises polymerizing said hydrophilic monomer in a reaction vessel wherein, at least a portion of the inner wall surface of said reaction vessel repeatedly exposed to said aqueous solution or said absorbent polymer and a gas has the surface roughness, $R_{max}$, thereof adjusted to not more than 3 μm and at the same time said portion of the inner wall of surface is kept cooled constantly to a temperature of not more than 70° C. from behind said portion with a cooling medium.

15 Claims, 3 Drawing Sheets

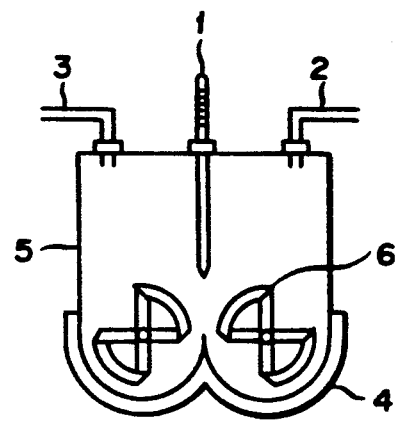
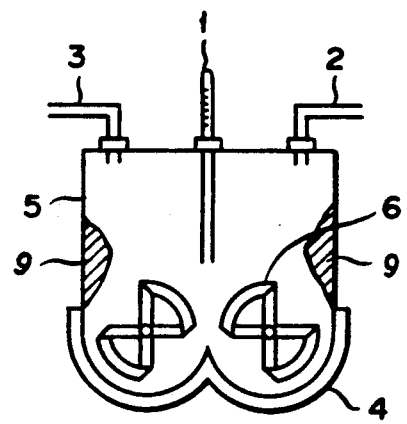
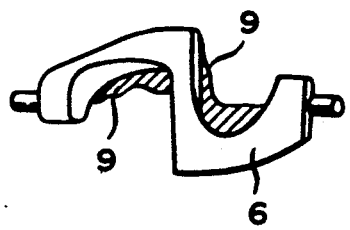
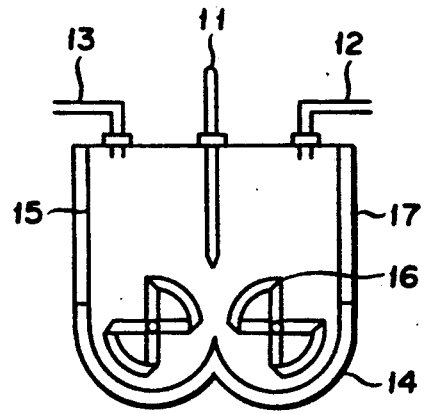
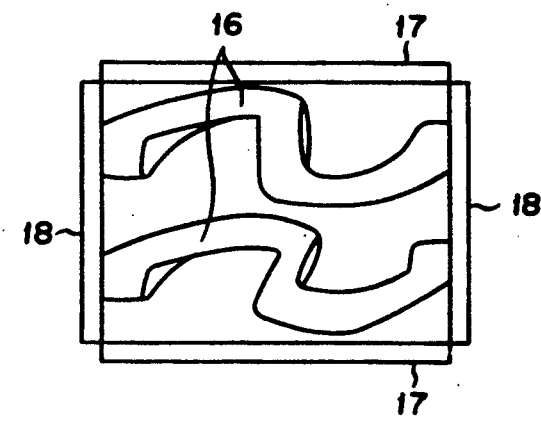

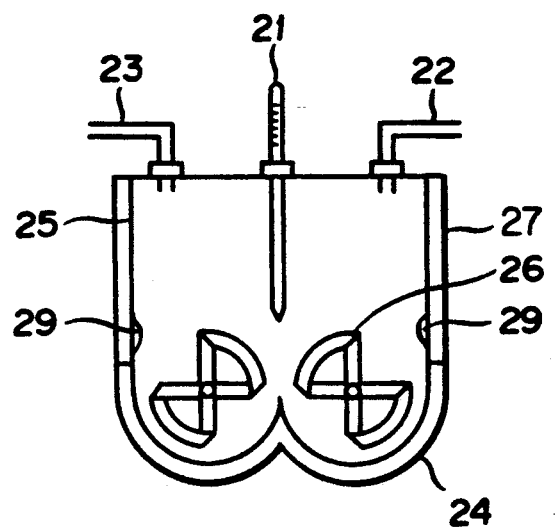
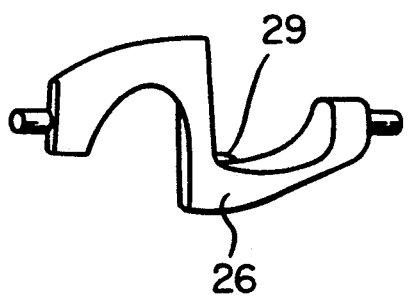
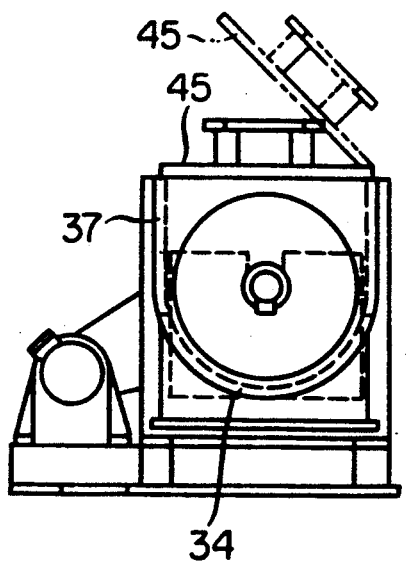

METHOD FOR PRODUCTION OF ABSORBENT POLYMER

This is a continuation-in-part application of U.S. patent application Ser. No. 07/355,916, filed on May 23, 1989, now abandoned.

BACKGROUND OF THE INVENTION

1. Field of the Invention

This invention relates to a method for the production of an absorbent polymer. More particularly, it relates to a method for the production of an absorbent polymer, which method is such that the absorbent polymer being formed within a reaction vessel avoids the occurrence of a hydrated gel of the absorbent polymer liable to adhere to the inner wall of the reaction vessel and, therefore, the absorbent polymer can be obtained stably and efficiently.

2. Description of the Prior Art

Heretofore, cross-linked polymers having acrylic acid or salts thereof as main components have been widely utilized for example, in disposable diaper, sanitary articles, agricultural/horticultural soil conditioners, and dehydrators.

The manner of producing such cross-linked polymers by an aqueous solution polymerization is disclosed in U.S. Pat. No. 4,625,001. In this method, an aqueous solution of a monomer is polymerized using a two-arm type kneader disclosed in FIGS. 1 and 2 of the U.S. Pat. No. 4,625,001 to obtain a hydrated gel-like polymer, possessing a cross-linked structure then drying and pulverizing the polymer thereby producing a cross-linked polymer. When the production is carried out by this method, however, an adhesive hydrated gel is joined during the course of polymerization of the monomer which adheres to the inner wall of the reaction vessel, to the extent of lowering the yield and, at the same time, impairing the efficiency of the work of removing the desired absorbent polymer from the reaction vessel. As the amount of the production increases, the deposit of the hydrated gel on the inner wall of the reaction vessel continues to grow. The reaction vessel, therefore, requires a periodic cleaning work. This fact seriously degrades the productivity of the conventional method. Trouble of this nature occurs particularly conspicuously on the portion of the inner surface of the reaction vessel which is repeatedly exposed to the reactants as well as the mainly inert gas.

For the solution of this problem, U.S. Pat. No. 4,625,001 discloses as a preferred embodiment, a method which comprises carrying out the polymerization reaction for the production of a hydrated gel polymer, possessing a cross-linked structure in a kneader lined with a fluorine resin coating. Japanese Patent Laid-Open SHO 57(1982)-63,305 discloses a method which comprises performing the polymerization reaction for the production of a water-soluble gel polymer in a vessel lined with a fluorine resin coating as a preferred embodiment. However, the fluorine resin coating cannot be called fully effective in precluding the adhesion of the gel polymer. The effectiveness of the fluorine resin coating in inhibiting the deposition is degraded as the number of cycles of reaction increases. Thus, these methods still entail the problem of requiring periodic repeated applications of the coating.

Japanese Patent Laid-Open SHO 54(1979)-10,387 discloses a method which carries out the polymerization reaction for the production of an aqueous gel polymer in a polymerization vessel possessing an electrolytically polished stainless steel surface. However, this method is inferior to the method relying on the fluorine resin coating in terms of the ability to preclude the deposition of the polymer.

An object of this invention is to provide a novel method for the production of an absorbent polymer.

Another object of the present invention is to provide a method for producing an absorbent polymer stably with high operational efficiency.

SUMMARY OF THE INVENTION

The foregoing objects are accomplished by a method for the production of an absorbent polymer by the polymerization of a liquid containing an aqueous hydrophilic monomer solution in a reaction vessel provided with at least one rotary stirring blade, which comprises polymerizing said hydrophilic monomer in a reaction vessel wherein at least a portion of the inner wall surface of said reaction vessel repeatedly exposed to said aqueous solution or said absorbent polymer and a gas has the surface roughness, $R_{max}$, thereof adjusted to not more than 3 μm and, at the same time, said portion of the inner wall surface is kept constantly cooled to a temperature of not more than 70° C. from behind said portion with a cooling medium.

In accordance with the method of this invention, the inner wall of the reaction vessel used for the polymerization reaction is adjusted to a specific surface condition and is kept cooled from behind the rear surface and the adjustment of the surface condition and the cooling thereof from behind manifest a conspicuous synergistic effect in preventing the deposition of the reactant on the inner wall of the reaction vessel. Even when the number of reaction batches grows, therefore, the reaction vessel shows virtually no decrease in the available volume thereof and permits a notable decrease in the frequency of periodic cleaning. The method of the present invention, therefore, provides a remarkable improvement in the productivity of the absorbent polymer.

BRIEF DESCRIPTION OF THE DRAWINGS

FIG. 1 is a diagram of a rotary stirring blade provided for a reaction vessel used in Control 1, FIG. 2 is a schematic front view of a reaction vessel used in Control 1, FIG. 3 is a diagram illustrating the condition of deposition of substances on the inner wall of the reaction vessel after 20 batches of polymerization reaction of Control 1, FIG. 4 is a diagram illustrating the condition of deposition of substances on the surface of the rotary stirring blade after 20 batches of polymerization reaction of Control 1, FIG. 5 is a schematic front view of a reaction vessel used in Example 1, FIG. 6 is a schematic plane view of a reaction vessel used in Example 1, FIG. 7 is a diagram illustrating the condition of deposition of substances on the inner wall of the reaction vessel after 20 batches of polymerization reaction of Example 4, FIG. 8 is a diagram illustrating the condition of deposition of substances on the surface of the rotary stirring blade of Example 4, FIG. 9 is a schematic front view of a reaction vessel in Example 6.

EXPLANATION OF THE PREFERRED EMBODIMENT

Figure 10:
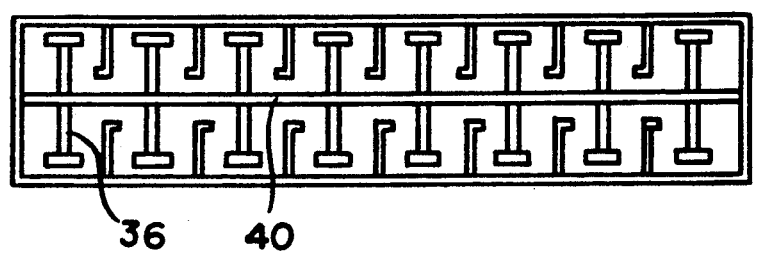
FIG. 10 is a diagram of a reaction vessel of Example 6 divested of the upper lid and viewed from above.

The present invention will be described in detail below.

The structure of reaction vessel for use in this invention has no specific restriction except that it must possess at least one rotary stirring blade. It is preferable that the blade be capable of imparting a shearing force to a hydrated gel polymer being formed by the method of the advance of solution polymerization of a monomer disclosed in U.S. Pat. No. 4,625,001, for example. For this purpose, it is preferable that the reaction vessel has a plurality of rotary stirring blades. The reaction vessels which meet this description include a single-screw mixer, a single-screw extruder, a twin-screw kneader, and a triple-screw kneader, for example.

The reaction vessel to be used in the present invention has a construction described above, with at least that portion of the inner wall surface thereof subject to repeated exposure to the reactant adjusted to a surface roughness, $R_{max}$, of not more than 3 μm, and is provided on the reverse side of the said portion of the inner wall surface with a cooling device. The expression "portion of the repeatedly exposed inner wall surface" as used in this invention refers to the portion of surface which is repeatedly exposed to the various motions produced mainly in the vertical direction alternately by the reactant, i.e. the aqueous solution of monomer or the absorbent polymer, and the mainly inert gas during the stirring to be performed during the course of the polymerization and which is out of the reach of the physical force such as, for example, sliding generated by the stirrer for the removal of the deposited substance. It is generally on this portion that the deposition occurs most heavily. This repeatedly exposed portion generally is located in the proximity of the interface between the reactant and the gas, though it is variable with the behavior and form of the reactant and the condition of stirring. At times, this portion expands throughout the entire inner wall surface of the reaction vessel. The repeatedly exposed portion, therefore, is to be determined in due consideration of the behavior and form of the reactant, the condition of stirring, etc.

For the reaction vessel to be used for the production by the method of this invention, it is an essential condition that the reaction vessel should possess at least in the portion of the inner wall surface thereof repeatedly exposed to the reactant and the gas, a surface roughness adjusted to the specific value mentioned above and should be provided with means capable of cooling the rear or outer side of the repeatedly exposed portion (hereinafter referred to as cooling means). The adjustment of surface roughness may cover the entire repeatedly exposed portion or the entire inner wall surface of the reaction vessel. The cooling means may cover the rear or outer side of the entire repeatedly exposed portion or the entire outer or rear side wall surface of the reaction vessel.

The provision of the cooling means for the reaction vessel on the rear or outer side thereof may be attained by various means. For example, a device for spraying a cooling medium such as water a jacket, e.g. a unitary jacket, two or more-part jacket or a spiral tube capable of injecting and discharging with the cooling medium at a desired flow rate may be cited. Where the reactant requires a heat treatment of over 70° C. during the course of the production of the absorbent polymer, the cooling means must be limited to the repeatedly exposed portion or to an upper part of the reaction vessel, which part includes the repeatedly exposed portion. In this case, the two-part jacket is preferable, the lower part of which serves as a heating means and the upper part, including the repeatedly exposed portion, of which serves as the cooling means. The lower part of the reaction vessel must be furnished with a heat-treating device. Where no heat treatment is required during the course of the production of the hydrated gel polymer, the cooling means preferably embraces the entire outer wall surface of the reaction vessel. In this case, the unitary or two-part jacket is preferable. Where the reactant is a highly adhesive and adheres heavily to the stirrer, it is preferable to provide a cooling medium path inside the rotary stirring blades and consequently provide a cooling means for the rotary stirring blades themselves, so as to internally cool a surface of the rotary stirring blades with a cooling medium such as water.

For the present invention, at least the repeatedly exposed portion of the entire inner wall surface of the reaction vessel is required to possess a surface roughness, $R_{max}$, of not more than 3 μm. The term "surface roughness, $R_{max}$," as used in this invention refers to the magnitude of $R_{max}$ which is defined in Japanese Industrial Standard (JIS) B0601. If the surface roughness, $R_{max}$, exceeds 3 μm, the conspicuously desired effect of preventing deposition is not attained. A particularly conspicuous effect in the prevention of the deposition is attained by adjusting the surface roughness, $R_{max}$, to a level not more than 0.5 μm, preferably not more than 0.1 μm. The adjustment of the surface roughness, $R_{max}$, to a level of not more than 3 μm can be attained by buff polishing. To further decrease $R_{max}$ and for the surface smoothness to be consequently improved, the surface already polished by buffing is preferably subjected to immersion electrolytic polishing or electrolytic composite polishing. The adjustment of surface roughness described above must be provided to at least the repeatedly exposed portion of the entire inner wall surface of the reaction vessel. The portion other than the repeatedly exposed portion of the entire inner wall surface or the surface of the rotary stirring blades may be adjusted to the surface roughness defined above or adjusted by other means suitably by fluorine resin coating. From the viewpoint of durability, however, it is preferable that the adjustment of surface roughness to the defined level described above is provided to the entire inner wall surface. Where the reactant is conspicuously adhesive, this adjustment is preferably provided further to the surface of the rotary stirring blades.

The reaction vessel to be used in the present invention possesses the surface roughness and the cooling means on the rear side as described in detail above. During the course of the polymerization, the combination of the surface roughness and the rear side cooling means manifest a conspicuous synergistic effect in preventing the absorbent polymer from adhering to the inner wall surface. This desirable result is not obtained when either the surface roughness adjustment or the rear side cooling means are omitted.

Figure 11:
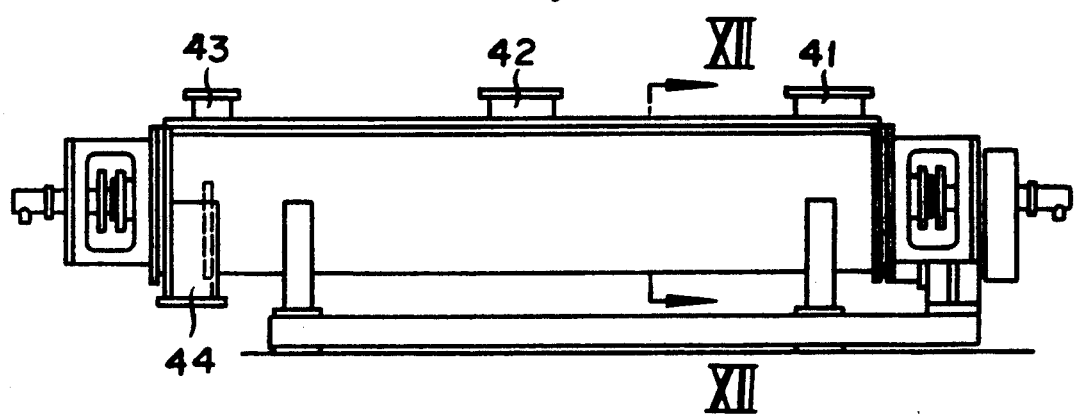
FIG. 11 is an explanatory diagram illustrating in side elevation the reaction vessel of Example 6.
Figure 12:
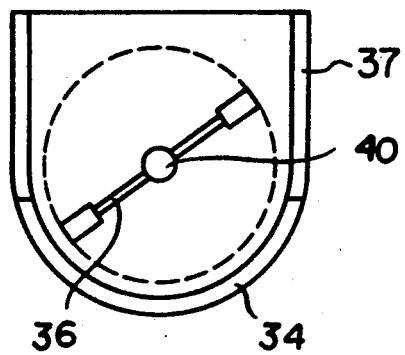
FIG. 12 is a cross-sectional view of FIG. 11 along with a line XII—XII.

Desired configurations of the reaction vessel to be used in the present invention are shown in FIG. 5, FIG. 6, FIG. 9, FIG. 10, and FIG. 11.

In the production of the absorbent polymer by the aqueous solution polymerization of a monomer to form the absorbent polymer in the reaction vessel described in detail above, the method of the present invention is accomplished by carrying out the polymerization reaction by well-known procedure while keeping at least the repeatedly exposed portion of the entire inner wall surface of the reaction vessel cooled to a temperature of not more than 70° C. by the use of a cooling medium such as water. For more effective prevention of deposition, it is preferable to apply the cooling to the entire upper part of the reaction vessel including the repeated exposed portion. Where the polymerization reaction does not require any special heat treatment, it is preferable to apply the cooling to the entire inner wall surface of the reaction vessel. Where the deposition is also observed to occur on the surface of the rotary stirring blades, it is preferable to have a cooling water path flow inside the rotary stirring blades to keep the surface of the rotary stirring blades at a temperature of not more than 70° C.

If the temperature of the cooling water exceeds 70° C., the prevention of the deposition cannot be fully realized. The effect of the cooling increases in proportion to the decrease of temperature of the cooling water. The temperature of the cooling water is in the range of $-10°$ to 60° C., preferably 0° to 50° C., more desirably 0° to 40° C., and most preferably 0° to 30° C. Cooling by the use of the cooling medium must continue constantly between the time the polymerization reaction is started and the time it is completed. Preferably, the cooling treatment is continued while the hydrated gel polymer is being removed from the reaction vessel after the completion of the polymerization reaction.

The monomer to be used in the present invention is a compound which, on being subjected to aqueous solution polymerization, forms a cross-linked structure, suitably by copolymerization of a water-soluble monomer and a cross-linking monomer possessing at least two polymerizing double bonds within the molecular unit thereof. Such cross-linked structure may be obtained by subjecting a hydrophilic monomer to aqueous solution polymerization in the presence of a hydrophilic macromolecule such as starch, cellulose, or polyvinyl alcohol, thereby simultaneously effecting polymerization and formation of a graft bond or complex.

The hydrophilic monomers which are usable in the present invention include for example, acrylic acid, methacrylic acid, 2-acrylamide-2-methylpropanesulfonic acid, 2-(meth)acryloylethanesulfonic acids, alkali metal salts or ammonium salts thereof, acrylamide, methacrylamide, acrylonitrile, 2-hydroxyethyl(meth)acrylates, methyl acrylate, and maleic acid. One member or a mixture of two or more members selected from the group of hydrophilic monomers enumerated above may be used.

The cross-linking monomers which are usable in this invention include for example, di(meth)acrylate of ethylene glycol, diethylene glycol, triethylene glycol, polyethylene glycol, propylene glycol, 1,4-butanediol, 1,5-pentanediol, 1,6-hexanediol, neopentyl glycol, glycerol, trimethylolpropane, pentaerythritol and the like, tri(meth)acrylates of glycerol, trimethylol propane, pentaerythritol and the like, tetra(meth)acrylate of pentaerythritol and the like, N,N'-methylenebisacrylamide, N,N'-methylenebismethacrylamide, and triallyl isocyanurate. One member or a mixture of two or more members selected from the group of cross-linking monomers enumerated above may be used.

Of the monomers mentioned above, it is particularly preferred to use as (A) the monomer, at least one member or a mixture of two or more members selected from the group consisting of acrylic acid, methacrylic acid, and alkali metal salts and ammonium salts thereof and as (B) a cross-linking monomer possessing at least two polymerizing double bonds in the molecular unit in respective amounts such that the ratio of (B) the cross-linking monomer, to (A) the monomer, is in the range of 0.001 to 50 mol %, preferably 0.01 to 10 mol %. As (B) the cross-linking monomer, at least one member or a mixture of two or more members selected from the group of cross-linking monomers mentioned above can be used. If the amount of (B) the cross-linking monomer to be used herein is less than 0.001 mol % based on (A) the monomer, the hydrated gel polymer consequently obtained is soft and viscous. Owing to this viscosity, the polymer tends to retain its bulky state and defy size reduction on exposure to a mechanical shearing force. If the amount exceeds 50 mol %, the cross-linked polymer consequently obtained is deficient in water-absorbing property and ion-exchange capacity.

The reaction vessel to be used in the present invention is provided with rotary stirring blades. It is preferable to be capable of imparting a shearing force due to the rotation of the rotary stirring blades to the hydrated gel polymer which is formed in consequence of the progress of the polymerization. A single-screw mixer and a twin-screw kneader (hereinafter referred to collectively as "kneader") may be mentioned as examples of the reaction vessel meeting the description given above. The kneader is used so that the two rotary stirring blades are rotated at an equal speed or different speeds in the mutually opposite directions. When the two rotary stirring blades are rotated at one equal speed, they are used in such a state that their radii of rotation partly overlap each other. When they are rotated at two different speeds, they are used in such a state that their radii of rotation avoid overlapping each other. The rotary stirring blades may be of the sigma type, the S type, the Banbury type, or the fish tail type.

For the polymerization induced in the reaction vessel used in the present invention to proceed under an atmosphere inert to the said reaction, it is preferable to displace the gas entrapped in the reaction vessel with an inert gas in advance of the polymerization. In order to condense the steam generated by the heat of the polymerization reaction, the reaction vessel is preferably provided with a reflux condenser in the upper part thereof. Alternatively, the gaseous mixture generated in the reaction vessel may be expelled by introducing an inert gas to the reaction vessel.

For the purpose of initiating the free radical aqueous solution polymerization of the monomer, any of the known water-soluble radical polymerization initiators may be used. Examples of the polymerization initiators are persulfates, hydrogen peroxide, and water-soluble azo compounds. Such known water-soluble radical polymerization initiators may be used alone. Optionally, it may be used in the form of a redox type initiator as combined with a sulfite, a hydrogen sulfite, a thiosulfate, an L-ascorbic acid, or a ferrous salt. The amount of the polymerization initiator to be used is in the range of 0.001 to 5 mol %, preferably 0.01 to 1 mol %, based on the amount of the monomer.

The particles of absorbent polymer obtained by the method of this invention can be satisfactorily used in their unmodified form as absorbent, water-retaining agents, ion-exchange resins, and adsorbents. It is, however, preferable to dry them for the sake of convenience of handling. The cross-linked polymer obtained by drying may be used in its unmodified form as a coarse powder or in a finely divided form as an absorbent, a water-retaining agent, an ion-exchange resin, an adsorbent, or a desiccant. The average particle diameter of the absorbent polymer powder is generally in the range of 0.05 to 5 mm, preferably 0.1 to 1 mm.

The present invention will be described more specifically below with reference to working examples. It should be noted, however, that this invention is not limited by the following examples.

Control 1

A reaction vessel 5 (see FIG. 2) was obtained by preparing a lidded twin-screw kneader possessing two rotary stirring blades 6 (see FIG. 1) each of a sigma type vane 110 mm in radius of rotation, provided with a thermometer 1, measuring 10 liters in inner volume, 240 mm × 220 mm in area of the opening, and 260 mm in depth, and having the bottom part thereof and the lateral part thereof to a height of 100 mm from the bottom covered with a jacket 4 and a side jacket (not shown) at the both sides of the bearings (not shown) of the shafts of the stirring blades 6, and then finishing the inner wall of the kneader and the surface of the rotary stirring blades with a #200 buff thereby adjusting surface roughness, $R_{max}$, to 0,7 μm. Nitrogen gas was fed into the reaction vessel via a nitrogen gas inlet 2 to displace the entrapped air which was exhausted from an outlet 3. In this reaction vessel, was charged an aqueous monomer solution (40 wt %) prepared by dissolving 2 g of N,N'-methylenebisacrylamide in 5.5 kg of an aqueous acrylic acid solution having 75 mol % thereof neutralized with caustic soda, a nitrogen gas was bubbled through the resultant solution and an aqueous solution of 5 g of ammonium persulfate in 30 g of water and an aqueous solution of 0.1 g of L-ascorbic acid in 5 g of water were added thereto. At this time, cooling water kept at a temperature of 30° C. was passed through the jacket 4 and the lateral part jacket 18 and the rotary stirring blades 6 were rotated at a rate of 30 rpm. The monomer began to polymerize at a reactant temperature of 30° C. After 5 minutes 30 seconds following the start of the polymerization, the temperature reached a peak of 90° C. Stirring with the rotary stirring blades 6 and the cooling with the cooling water were further continued for 15 minutes to age the polymer. Thereafter, the gel polymer was recovered. A total of 20 batches of polymerization was carried out by repeating the procedure described above. The inner wall surface (see FIG. 3) of the reaction vessel which had been used for the 20 batches of polymerization and the surface of the rotary stirring blades (see FIG. 4), i.e. the description of "repeatedly exposed portion" was found to be covered with a large amount of deposit 9. An absorbent polymer (A) obtained from the hydrated gel polymer produced in the 20th batch of polymerization was tested for absorption capacity and soluble content. The condition of gel deposition at the end of the 20th batch of polymerization and the results of the test are shown in Table 1. The absorption capacity and the soluble content of the absorbent polymer were determined by the following procedures.

A hydrated gel polymer sample was placed on a 50-mesh metallic gauze and dried with hot air at 150° C. for 120 minutes. The dried polymer was pulverized with a shaking mill and classified with a 20-mesh metallic gauze. The powder which had passed the metallic gauze (hereinafter referred to as "absorbent") was tested for absorption capacity and soluble content by the following method. A bag of nonwoven fabric (40 mm × 150 mm) resembling a tea bag was uniformly packed with 0.2 g of the absorbent polymer (A), kept immersed in a 0.9% aqueous common salt solution for 30 minutes, and then weighed. Same empty bag was similarly immersed and the amount of the aqueous solution absorbed thereby was used as a blank. The absorption capacity of the absorbent polymer (A) was calculated in accordance with the following formula.

$$\text{Absorption capacity} = \frac{\text{Weight (g) of bag after absorption} - \text{blank (g)}}{\text{Weight (g) of absorption polymer}}$$

0.5 g of the absorbent polymer (A) was then dispersed in 1,000 ml of deionized water. The dispersion was stirred for 30 minutes, then passed through a No. 6 filter paper. The solid content of the filtrate was weighed. The soluble content of the absorbent polymer (A) was calculated in accordance with the following formula.

$$\text{Soluble content (wt \%)} = \frac{\text{Weight of filtrate} \times \text{solid content of filtrate (wt \%)}}{0.5}$$

EXAMPLE 1

In place of the reaction vessel used in Control 1, a reaction vessel 15 (see FIGS. 5 and 6) provided with a nitrogen gas inlet 12, an outlet 13 and a thermometer 11, was obtained by preparing a lidded twin-screw kneader possessing two rotary stirring blades 16, each of a sigma type vane having a radius of rotation of 110 mm and containing therein a cooling water path, measuring 10 liters in inner volume, 240 mm × 220 mm in area of the opening, and 260 mm in depth, and covered with the bottom part jacket 14, the upper part jacket 17, and the lateral part jacket 18 thereof covered with a jacket. The inner wall of the kneader and the surface of the rotary stirring blades were subjected to Hitachi Shipbuilding & Engineering Co., Ltd. type electrolytic composite polishing to have the surface roughness, $R_{max}$, adjusted to 0.1 μm. The polymerization of a monomer was carried out by repeating the procedure of Control 1, except that cooling water kept at a temperature of 30° C. was passed through all of the bottom jacket, upper jacket, lateral jacket, and a cooling water path in the rotary stirring blades. In each of the batches of polymerization, the peak temperatures of polymerization were in the range of 85° to 87° C. After a total of 20 batches of polymerization, absolutely no deposition was recognized on the parts of the inner wall of the reaction vessel and the surface of the rotary stirring blades designated as the description of "repeatedly exposed portion." An absorbent polymer (1) obtained from the hydrated gel polymer was tested for absorption capacity and soluble content in the same manner as in Control 1. The condition of gel deposition after the completion of the 20th batch of polymerization and the results of the test are shown in Table 1.

Control 2

The procedure of Example 1 was repeated, except that hot water kept at a temperature of 90° C., was passed through the jacket and the cooling water path distributed inside the rotary stirring blades between the time the peak temperature was reached and the time the hydrated gel polymer was recovered, in place of the cooling water kept at a temperature of 30° C. The inner wall of the reaction vessel which had been used for a total of 20 batches of polymerization and the surface of the rotary stirring blades, namely "repeatedly exposed portion" were found to be covered with a large amount of deposit. An absorbent polymer (B) obtained from the hydrated gel polymer, was tested for absorption capacity and soluble content in the same manner as in Example 1. The condition of gel deposition after the completion of the 20th batch of polymerization and the results of the test are shown in Table 1.

EXAMPLE 2

The procedure of Example 1 was repeated, except that the surface roughness, $R_{max}$, was adjusted to 0.5 μm by subjecting the surfaces to finishing with a #400 buff and then to immersion electrolytic polishing. The inner wall of the reaction vessel which had been used for a total of 20 batches of polymerization and the surface of the rotary stirring blades, namely the "repeatedly exposed portion" was found to be covered with a very small amount of deposit. An absorbent polymer (2) obtained from the hydrated gel polymer was tested for absorption capacity and soluble content. The condition of gel deposition after the completion of the 20th batch of polymerization and the results of the test are shown in Table 1.

EXAMPLE 3

The procedure of Example 1 was repeated, except that hot water kept at a temperature of 90° C., was used in place of the part of the cooling water at 30° C. which was passed through the bottom part jacket 14 between the time the peak temperature was reached and the time the hydrated gel polymer was recovered. Similarly to Example 1, absolutely no deposit was recognized on the parts of the inner wall of the reaction vessel which had been used for a total of 20 batches of polymerization and the surface of the rotary stirring blades, namely the "repeatedly exposed portion". An absorbent polymer (3) obtained from the hydrated gel polymer was tested for absorption capacity and soluble content. The condition of gel deposition after the completion of the 20th batch of polymerization and the results of the test are shown in Table 1.

Control 3

The procedure of Example 1 was repeated, except that hot water kept at a temperature of 90° C. was passed in the place of the part of the cooling water at 30° C. which was passed through the upper part and lateral part jacket between the time the peak temperature was reached and the time the hydrated gel polymer was recovered. A large amount of deposit was recognized on the parts of the inner wall of the reaction vessel which had been used for a total of 20 batches of polymerization and the surface of the rotary stirring blades namely the "repeatedly exposed portion". An absorbent polymer (C) obtained from the hydrated gel polymer was tested for absorption capacity and soluble content. The condition of gel deposition after the completion of the 20th batch of polymerization and the results of the test are shown in Table 1.

EXAMPLE 4

The procedure of Example 1 was repeated, except that the surface roughness, $R_{max}$, was adjusted to 0.7 μm by finishing the surface with a #200 buff. A small amount of deposit 29 was recognized on the parts of the inner wall (see FIG. 7) of the reaction vessel which had been used for a total of 20 batches of polymerization and the surface (see FIG. 8) of the rotary stirring blades, namely the "repeatedly exposed portion". An absorbent polymer (4) obtained from the hydrated gel polymer was tested for absorption capacity and soluble content. The condition of gel deposition after the completion of the 20th batch of polymerization and the results of the test are shown in Table 1. The digits raised as a decade of the members in FIGS. 5 and 6 designate the same members in FIGS. 7 and 8.

Control 4

The procedure of Example 1 was repeated, except that a lidded twin-screw kneader possessing two rotary stirring blades each of a sigma type vane having a radius of rotation of 110 mm and containing a cooling water path, measuring 10 liters in inner volume, 240 mm×220 mm in area of the opening, and 260 mm in depth, having the bottom part, the upper part, and the lateral part thereof covered with a jacket, and having the surface of the rotary stirring blades and the inner wall of the kneader adjusted to a surface roughness, $R_{max}$, of 3.5 μm was used. After a total of 9 batches of polymerization, a large amount of deposit was formed on the parts of the inner wall of the reaction vessel and the surface of the rotary stirring blades, namely the "repeated exposed portion" rendering the continued use of the reaction vessel infeasible. An absorbent polymer (D) obtained from the hydrated gel polymer was tested for absorption capacity and soluble content. The condition of gel deposition after the completion of the 9th batch of polymerization and the results of the test are shown in Table 1.

EXAMPLE 5

In the same reaction vessel as used in Example 1, nitrogen gas was blown in to displace the entrapped air. In this reaction vessel, was charged an aqueous monomer solution prepared by dissolving 1,200 g of acrylic acid, 100 g of sodium 2-acrylamide-2-methylpropane-sulfonate, 200 g of acrylamide, and 1.5 g of N,N'-methylenebisacrylamide in 4,000 g of water and bubbling nitrogen gas through the resultant aqueous solution, together with an aqueous solution of 0.6 g of an aqueous 35% hydrogen peroxide solution in 50 g of water, an aqueous solution of 1 g of L-ascorbic acid in 100 g of water, and an aqueous solution of 8 g of 2,2'-azobis(2-amidinopropane) hydrochloride (produced by Wako Pure Chemical Industries Ltd.) in 100 g of water was added thereto. At this time, cooling water kept at a temperature of 40° C., was passed through a cooling water path distributed in the bottom part, upper part, and lateral part jacket and in the rotary stirring blades and the rotary stirring blades were rotated at a rate of 30 rpm. The polymerization reaction began, when the temperature of the aqueous solution in the reaction vessel reached 37° C. After 8 minutes following the start of the polymerization, the temperature reached a peak of 85° C. The stirring with the rotary stirring blades and the cooling with the cooling water were then continued for 5 minutes. 1,400 g of sodium carbonate powder was then added to the polymerization mixture to neutralize the polymer. The consequently formed gel was recovered, Thereafter, a total of 20 batches of polymerization was carried out by following the procedure described above. Absolutely no deposit was observed on the parts of the inner wall of the reaction vessel which had been used for a total of 20 batches of polymerization and the surface of the rotary stirring blades, namely the "repeatedly exposed portion". An absorbent polymer (5) obtained from the hydrated gel polymer was tested for absorption capacity and soluble content. The operational efficiency and the yield of the recovery of the hydrated gel polymer in the 20th batch of polymerization and the results of the test were as shown in Table 1.

Control 5

The procedure of Example 4 was repeated, except that the reaction vessel used in Control 1 was adopted in the place of the reaction vessel used in Example 5. A large amount of deposit was formed on the inner wall of the reaction vessel and the deposit in the form of rolls adhered to the rotary stirring blades during the 6th batch of polymerization. The hydrated gel polymer obtained during the 6th batch of polymerization contained lumps and, therefore, could not be easily disintegrated. An absorbent polymer (E) obtained by drying the recovered polymer still contained undried hydrated gel. The results of the test are shown in Table 1.

EXAMPLE 6

A reaction vessel (see 9 to 12) was obtained by preparing a lidded mixer, possessing on rotary stirring blades 36 provided inside the central axis 40 thereof with a cooling water path, measuring 10 liters in inner volume, and having the bottom part jacket 34, the upper part jacket 37, the lateral part jacket (not shown), and top plate 45 covered with a jacket and then subjecting the entire inner wall surface of the mixer, inclusive of the lid and the surface of the rotary stirring blades, to Hitachi Shipbuilding & Engineering Co., Ltd. type electrolytic composite polishing, thereby adjusting the surface roughness $R_{max}$, to 0.1 μm. Nitrogen gas was blown in the reaction vessel to displace the entrapped air.

In the reaction vessel, with the rotary stirring blade kept in motion at 40 rpm, an aqueous monomer solution obtained by dissolving 106 kg of acrylic acid having 75 mol % thereof neutralized with sodium hydroxide and 96 g of N,N'-methylenebisacrylamide in 158 kg of water and bubbling nitrogen gas through the resultant solution, an aqueous solution of 240 g of ammonium persulfate in 1,440 g of water, and an aqueous solution of 4.8 g of L-ascorbic acid in 240 g of water, were continuously introduced into the reaction vessel through inlets 41, respectively disposed in the reaction vessel over a period of 24 hours. At the same time, a hydrated gel polymer formed in consequence of the polymerization was continuously recovered. At this time, cooling water kept at a temperature of 30° C. was incessantly passed through the cooling water path distributed in the jacket and the shaft of the rotary stirring blade. After 24 hours' continuous polymerization, absolutely no deposit was recognized on the inner wall of the reaction vessel and on the surface of the rotary stirring blade. An absorbent polymer (6) obtained by drying the recovered polymer, was tested for absorption capacity and soluble content. The results of the test were as shown in Table 1.

EXAMPLE 7

In place of the reaction vessel used in Control 1, a reaction vessel provided with a nitrogen gas inlet, an outlet and a thermometer, was obtained by preparing a lidded twin-screw kneader possessing two rotary stirring blades, each or a sigma type vane having a radius of rotation of 110 mm and containing therein a cooling water path, measuring 10 liters in inner volume, 240 mm×220 mm in area of the opening, and 260 mm in depth, and covered with a unitary jacket. The inner wall of the kneader and the surface of the rotary stirring blades were subjected to Hitachi Shipbuilding & Engineering Co., Ltd. type electrolytic composite polishing to have the surface roughness, $R_{max}$, adjusted to 0.1 μm. The polymerization of a monomer was carried out by repeating the procedure of Control 1, except that cooling water kept at a temperature of 30° C. was passed through the unitary jacket, and a cooling water path in the rotary stirring blades. In each of the batches of polymerization, the peak temperatures of polymerization were in the range of 85° to 87° C. After a total of 20 batches of polymerization, absolutely no deposition was recognized on the parts of the inner wall of the reaction vessel and the surface of the rotary stirring blades designated as the description of "repeatedly exposed portion." An absorbent polymer (7) obtained from the hydrated gel polymer was tested for absorption capacity and soluble content in the same manner as in Control 1. The condition of gel deposition after the completion of the 20th batch of polymerization and the results of the test are shown in Table 1.

TABLE 1

| Example | Absorbent polymer | Condition of gel deposition after stated number of batches of polymerization | Absorption capacity | Soluble content (wt %) |
|---|---|---|---|---|
| Control 1 | (A) | Heavy deposition | 44 | 9 |
| Example 1 | (1) | No deposition | 43 | 5 |
| Control 2 | (B) | Heavy deposition | 46 | 11 |
| Example 2 | (2) | Very slight deposition | 43 | 5 |
| Example 3 | (3) | No deposition | 45 | 6 |
| Control 3 | (C) | Heavy deposition | 45 | 7 |
| Example 4 | (4) | Slight deposition | 42 | 5 |
| Control 4 | (D) | Heavy deposition | 46 | 13 |
| Example 5 | (5) | No deposition | 47 | 10 |
| Control 5 | (E) | Heavy deposition | 47 | 14 |
| Example 6 | (6) | No deposition | 43 | 6 |
| Example 7 | (7) | No deposition | 43 | 5 |

It is clearly noted from Table 1 that the occurrence of deposit was insignificant and the operational efficiency of the recovery of the hydrated gel polymer was satisfactory in the experiments resorting to the method of this invention. For the fixed monomer composition, the absorbent polymer obtained by the method of the present invention showed the same absorption capacity as and a smaller soluble content than the absorbent obtained by the method other than the present invention.

What is claimed is:

1. A method for the production of an absorbent polymer by the polymerization of a liquid containing an aqueous hydrophilic monomer solution composed of (A) at least one monomer selected from the group of acrylic acid, methacrylic acid, alkali metal salts and ammonium salts thereof, and (B) a cross-linking monomer possessing at least two polymerizing double bonds within the molecular unit thereof, the ratio of (B) said cross-linking monomer to (A) said monomer being in the range of 0.001 to 50 mol % in a reaction vessel provided with at least one rotary stirring blade, which comprises polymerizing said hydrophilic monomer in a reaction vessel wherein at least a portion of the repeatedly exposed inner wall surface has the surface roughness, $R_{max}$, thereof adjusted to not more than 3 μm and at the same time said portion is cooled constantly from behind said portion with a cooling medium having a temperature of not more than 50° C.

2. A method according to claim 1, wherein the surface of said rotary stirring blade and the inner wall of said reaction vessel are formed of stainless steel or stainless cast iron.

3. A method according to claim 2, wherein said surface roughness is adjusted to not more than 0.5 μm.

4. A method according to claim 2, wherein said surface roughness is adjusted to not more than 0.1 μm.

5. A method according to claim 3, wherein said adjustment of said surface roughness is performed by immersion electrolytic polishing.

6. A method according to claim 3, wherein said adjustment of said surface roughness is performed by electrolytic composite polishing.

7. A method according to claim 1, wherein said reaction vessel possesses a plurality of rotary stirring blades.

8. A method according to claim 7, wherein said reaction vessel possessing a plurality of rotary stirring blades is a twin-screw kneader.

9. A method according to claim 1, wherein said adjustment of surface roughness is given to the entire inner wall surface of said reaction vessel.

10. A method according to claim 9, wherein said adjustment of surface roughness is given to the entire surface of said rotary stirring blades.

11. A method according to claim 1, wherein the entire inner wall surface of said reaction vessel is cooled with a cooling medium.

12. A method according to claim 11, wherein said rotary stirring blades are provided therein with a cooling medium path and the surface of said rotary stirring blades is cooled from within by the use of said cooling medium.

13. A method according to claim 1, wherein the concentration of said aqueous monomer solution in the initial stage of polymerization is in the range of 10 to 50% by weight.

14. A method according to claim 1, wherein the temperature of the cool medium is to 40° C.

15. A method according to claim 1, wherein the temperature of the cooling medium is to 30° C.

* * * * *